(12) United States Patent
Katsuma

(10) Patent No.: US 7,188,973 B2
(45) Date of Patent: Mar. 13, 2007

(54) OPTICAL IMAGE PROJECTOR AND LIGHT SOURCE DEVICE FOR OPTICAL IMAGE PROJECTOR

(75) Inventor: Ryoji Katsuma, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 94 days.

(21) Appl. No.: 11/063,849

(22) Filed: Feb. 23, 2005

(65) Prior Publication Data
US 2005/0190560 A1   Sep. 1, 2005

(30) Foreign Application Priority Data
Feb. 27, 2004 (JP) ............................. 2004-054133
Sep. 10, 2004 (JP) ............................. 2004-264500
Jan. 25, 2005 (JP) ............................. 2005-016217

(51) Int. Cl.
 F21V 9/00   (2006.01)
 F21V 7/08   (2006.01)
(52) U.S. Cl. ........................ 362/293; 362/298; 362/300
(58) Field of Classification Search ........ 362/297–303, 362/294, 293, 252
See application file for complete search history.

(56) References Cited

U.S. PATENT DOCUMENTS

| 5,309,340 | A  | * | 5/1994 | Shigeta et al. ............... 362/299 |
| 5,491,525 | A  | * | 2/1996 | Yamasaki et al. .............. 353/98 |
| 6,210,024 | B1 | * | 4/2001 | Shida ........................ 362/345 |
| 6,402,346 | B1 | * | 6/2002 | Liao et al. ................. 362/294 |
| 6,527,417 | B2 | * | 3/2003 | Basey ........................ 362/264 |
| 6,575,599 | B1 | * | 6/2003 | Imamura et al. ............. 362/294 |
| 2004/0145896 | A1 | * | 7/2004 | Watanabe et al. ........... 362/294 |

FOREIGN PATENT DOCUMENTS

JP   A 2000-347293   12/2000

* cited by examiner

*Primary Examiner*—Alan Cariaso
*Assistant Examiner*—Leah S Lovell
(74) *Attorney, Agent, or Firm*—Oliff & Berridge, PLC

(57) ABSTRACT

A light source device includes: a light-emitting tube having a light-emitting portion that generates a light beam by an electric discharge between electrodes and a sealing portion provided on both sides of the light-emitting portion; an ellipsoidal reflector having a substantially ellipsoidal reflecting surface and irradiating the light beam irradiated by the light-emitting tube after converging at a predetermined position; a sub-reflection mirror having a reflecting surface opposed to the reflecting surface of the ellipsoidal reflector and covering the front side of the light-emitting tube in the light-irradiation direction to reflect the light beam emitted by the light-emitting tube toward the ellipsoidal reflector; and a transparent member provided in front of the ellipsoidal reflector in the light-irradiation direction to transmit the light beam. The light source device further includes a holder provided at a front end of the ellipsoidal reflector in the light-irradiation direction to hold an outer periphery of the parallelizing lens, the holder having a double structure with an absorber for absorbing light provided on an inner side thereof.

18 Claims, 8 Drawing Sheets

OPTICAL IMAGE PROJECTOR AND LIGHT SOURCE DEVICE FOR OPTICAL IMAGE PROJECTOR

BACKGROUND OF THE INVENTION

1. Field of the Invention

Exemplary aspects of the present invention relate to a light source device having: a light-emitting tube including a light-emitting portion that generates a light beam by an electric discharge between electrodes and a sealing portion provided on both sides of the light-emitting portion; an ellipsoidal reflector having a substantially ellipsoidal reflecting surface and irradiating a light beam irradiated by the light-emitting tube after converging at a predetermined position; a sub-reflection mirror having a reflecting surface being opposed to the reflecting surface of the ellipsoidal reflector and covering a front side of the light-emitting tube in the light-irradiation direction to reflect the light beam emitted by the light-emitting tube toward the ellipsoidal reflector; and a transparent member provided in front of the ellipsoidal reflector in the light-irradiation direction to transmit the light beam, and a projector equipped with the light source device.

2. Description of Related Art

Conventionally, projectors that modulate a light beam irradiated by a light source in accordance with image information to project an optical image in an enlarged manner have been used for presentation purpose at conferences, academic conferences, exhibitions etc. with a personal computer, and recently, such projectors are also used for a home theater.

A related art light source device used for such projector typically includes a discharge light-emitting tube with high intensity such as a metal halide lamp and a high pressure mercury lamp with a reflector attached thereto. Recently, there has been known a light source device employing an ellipsoidal reflector having an ellipsoidal reflecting surface (see, for example, Reference: Japanese Patent Laid-Open Publication No. 2000-347293, FIGS. 1 and 3).

In the ellipsoidal reflector, a light-emitting center of the light-emitting tube is located at a position of an ellipsoidal first focus on the rear side of the ellipsoidal reflector in the light-irradiating direction thereof so that a reflected light beam is converged at a position of a second focus on the front side in the light-irradiation direction. In the light source device having a sub-reflection mirror as well as the ellipsoidal reflector, the first focus and the second focus of the ellipsoidal reflector can be positioned closer to each other and the opening diameter can be smaller or shorter relative to the amount of the condensed light, so that the light can be efficiently condensed even with a light source with low output. Therefore, the projector with such light source device incorporated therein can be downsized and intensity thereof can be enhanced.

On the other hand, as disclosed in the Reference, a transparent member such as a parallelizing lens is provided in front of the ellipsoidal reflector in the light-irradiation direction, and a source light is incident on an optical system located at the downstream of the light source device through the transparent member.

It is preferable that the transparent member is held on a predetermined optical axis by a holder, and that the holder is provided so as to cover a front end of the ellipsoidal reflector in the light-irradiation direction over an outer periphery of the transparent member to prevent leakage of a stray light as an unused light that cannot be optically controlled.

Here, the holder likely faces thermal deterioration caused by irradiation of the light beam irradiated by the light-emitting tube. Thus, a shielding member using a metal material such as aluminum is provided to the holder to enhance thermal resistance.

When the short ellipsoidal reflector and sub-reflection mirror as described above are employed, the sub-reflection mirror is preferably configured to transmit an infrared ray or an ultraviolet ray to prevent overheating of the light-emitting tube covered by the sub-reflection mirror. In such case, since the infrared ray or ultraviolet ray is transmitted through a reflecting surface of the sub-reflection mirror toward the position where the transparent member is located while a visible light is reflected by the sub-reflection mirror toward the ellipsoidal reflector, the holder holding the transparent member is illuminated by the infrared ray or ultraviolet ray. Since the light-emitting tube is protruded toward the front side of the ellipsoidal reflector in the light-irradiation direction, the light-emitting tube is opposed to an inner circumferential surface of the holder. In the above configuration, since the stray light of the infrared ray or the ultraviolet ray transmitted through the sub-reflection mirror is reflected by the metallic shielding member provided at the inner side of the holder, a sealing portion or a light-emitting portion of the light-emitting tube is irradiated by the reflected stray light, which results in shortening lifetime of the light-emitting tube caused by overheating. Further, temperature rise inside of the light source device has also been a problem.

Also, in addition to the reflection of the stray light at the holder, a tip end of the sealing portion at the front side of the light-emitting tube in the light-irradiation direction is close to the light converging point as the second focus point of the ellipsoidal reflector, and thus faces harsh temperature rise, so that temperature of this portion requires to be lowered.

On the other hand, when the light-emitting tube is cooled with the air sent by a fan or the like, since a big opening cannot be formed at the holder shielding the stray light, sufficient cooling should be difficult. In addition, increase in size or rotation speed of the fan will cause generation of noise.

SUMMARY OF THE INVENTION

Exemplary aspects of the present invention is to provide a light source device having reduced size and noise as well as a capability of sufficiently lowering temperature of a light-emitting tube thereof, and a projector equipped with the light source device.

A light source device according to an aspect of the present invention includes: a light-emitting tube including a light-emitting portion that generates a light beam by an electric discharge between electrodes and a sealing portion provided on both sides of the light-emitting portion; an ellipsoidal reflector having a substantially ellipsoidal reflecting surface and irradiating a light beam irradiated by the light-emitting tube after converging at a predetermined position; a sub-reflection mirror having a reflecting surface thereof being opposed to the reflecting surface of the ellipsoidal reflector and covering a front side of the light-emitting tube in the light-irradiation direction to reflect the light beam emitted by the light-emitting tube toward the ellipsoidal reflector; a transparent member provided in front of the ellipsoidal reflector in the light-irradiation direction to transmit the light beam; and a holder provided at a front end of the ellipsoidal reflector in the light-irradiation direction to hold an outer periphery of the transparent member, in which the holder has a double structure with an absorber for absorbing the light beam provided on an inner side thereof.

According to the exemplary aspect of present invention, since the holder has the double structure with the absorber provided on the inner side thereof, the light beam irradiated by the light-emitting tube toward the front side of the ellipsoidal reflector in the light-irradiation direction and transmitted through the sub-reflection mirror is absorbed by the absorber, so that the light directly irradiating the holder or the light reflecting the light-emitting tube can be securely reduced. Therefore, even in a condition that an opening diameter of the ellipsoidal reflector is small due to size reduction of the light source device, and the sealing portion of the light-emitting tube is protruded from the ellipsoidal reflector and disposed oppositely to the holder to be covered therewith, the thermal deterioration of the holder and heating of the light-emitting tube caused by the light-irradiation can be securely reduced. Thereby, the lifetime of the light source device can be extended. Since the holder has the double structure with the absorber, and the light is absorbed by the absorber provided on the inner side thereof as described above, the thermal deterioration of the entire holder caused by the source light can be avoided. In other words, since the heat resistance is secured by the absorber, a material likely to be deteriorated by heat can be employed for the outer side. Therefore, for example, by forming the outer member with a synthetic resin or the like, reduction in size and cost can be enhanced and molding can be facilitated.

In the light source device of an exemplary aspect of the present invention, it is preferable that the holder has an intake port through which air is introduced and an exhaust port for exhausting the air.

In the light source device of an exemplary aspect of the present invention, it is preferable that the light source further includes; a fan to supply the air to the intake port, and a louver provided the intake port and having a plurality of vanes for rectifying the introduced air.

According to exemplary aspect of present invention, the external air is introduced through the intake port, so that the light-emitting tube can further be cooled. Further by including the fan and the louver, the air supplied by the fan and rectified by the louver can cool the light-emitting tube efficiently, so that the light-emitting tube can further be cooled.

In the light source device of an exemplary aspect of the present invention, it is preferable that the absorber includes a substantially cylindrical cylinder portion, and an airflow sent from the fan is introduced into the intake port of the holder in a direction along an inner circumferential surface of the absorber, and the airflow introduced through the intake port flows and circulates along an inner circumferential surface of the ellipsoidal reflector and/or the absorber.

In the light source device of an exemplary aspect of the present invention, it is preferable that the fan includes a discharge hole for discharging the airflow, and the intake port of the holder and the discharge hole of the fan are connected by a duct.

According to exemplary aspect of present invention, the airflow sent from the fan is introduced through the intake port of the holder in a direction along the inner circumferential surface of the absorber and flows and circulates along the inner circumferential surface of the ellipsoidal reflector and/or the absorber. Thereby, the ellipsoidal reflector and/or the absorber can be uniformly cooled. Since the discharge hole for discharging the airflow from the fan and the intake port of the holder are connected by the duct, the air blown out from the fan can be fully sent into the light source device. In other words, loss in airflow volume and airflow pressure is restrained by the duct, so that the airflow discharged from the fan can be circulated smoothly along the inner circumferential surface of the ellipsoidal reflector and/or the holder.

By circulating the airflow supplied from the outside along the inner circumferential surface of the ellipsoidal reflector and/or the absorber with sufficient airflow volume, even if the temperature of the ellipsoidal reflector, the light-emitting portion and the absorber rises due to the light irradiated by the light-emitting tube, they can be efficiently cooled with the circulating cooling air.

Therefore, since the light irradiated by the light-emitting tube can be sufficiently absorbed by the cooled absorber, temperature of the light-emitting tube can further be lowered.

Although the intake port is provided at an arbitrary position of the holder, the plurality of vanes of the louver extend substantially along the inner circumferential surface of the absorber, so that the airflow of the cooling air circulating substantially around the center axis of the ellipsoidal reflector is not blocked by the louver.

In the light source device of an exemplary aspect of the present invention, it is preferable that the vanes are so disposed to incline against the light-emitting portion from the intake port with respect to an opening side of the intake port.

According to exemplary aspect of present invention, due to the above-described light absorption by the absorber, temperature can especially lowered at an end of the sealing portion of the light-emitting tube protruding from the ellipsoidal reflector. Thus, by inclining the vanes toward the light-emitting portion and sending the air from the outside toward the light-emitting portion, temperature of the light-emitting tube can be uniformly lowered more efficiently and thoroughly. Moreover, only the airflow volume to sufficiently cool the light-emitting portion is required for the air to be introduced, so that the electric power consumption of the fan can be restrained and noise can be reduced.

In the light source device of an exemplary aspect of the present invention, it is preferable that the vanes are formed integrally with the absorber as cut pieces formed by cutting and bending a part of the absorber.

According to exemplary aspect of present invention, since the absorber and the vanes are integrally formed, when the air from the outside passes through the louver, the external air can cool the absorber that is likely heated by the light absorption as well as the vanes. In addition, since the vanes are made of the same material as the absorber, the source light can also be absorbed at the louver.

Therefore, since the light irradiated by the light-emitting tube can be sufficiently absorbed by the cooled absorber and the vanes, temperature of the light-emitting tube can further be lowered.

By forming the vanes from a sheet metal material by a cut working method such as press working, cost required for separately forming the louver or an assembling process can be saved, so that cost can be lowered.

According to another exemplary aspect of the present invention, a projector that forms an optical image by modulating a light beam irradiated by a light source in accordance with image information and projects the optical image in an enlarged manner includes: a light source device of the present invention.

According to exemplary aspect of present invention, since the light source device of the present invention provides functions and advantages as described above, the same functions and advantages can also be obtained, so that size and noise of the projector can be reduced.

DETAILED DESCRIPTION OF EXEMPLARY EMBODIMENT(S)

1. First Exemplary Embodiment

A first exemplary embodiment of the present invention will be described below with reference to the attached drawings.

Figure 1:
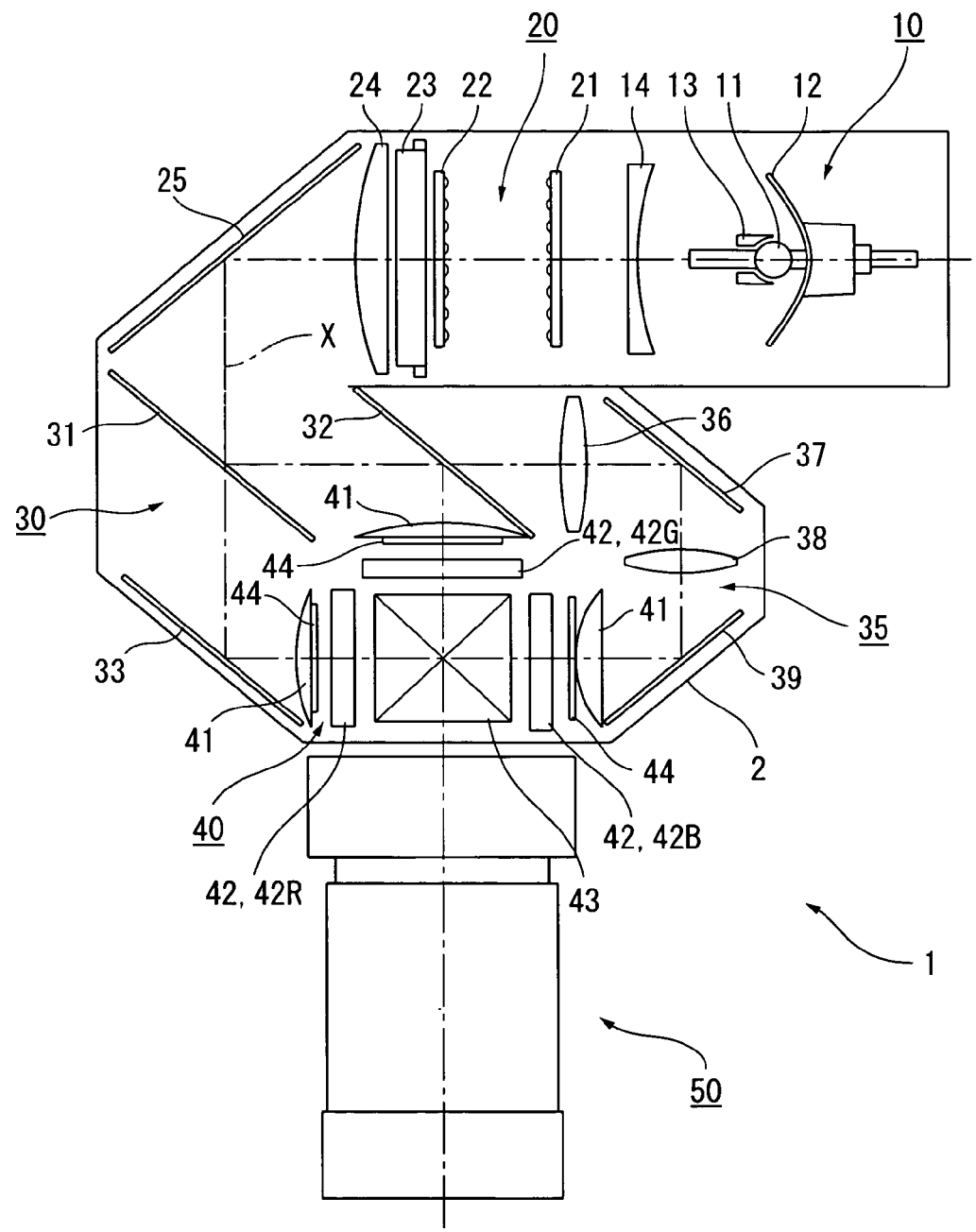
FIG. 1 is a plan view schematically showing an internal structure of a projector according to a first exemplary embodiment of the present invention.

FIG. 1 is a schematic illustration showing an optical system of a projector 1 according to a first exemplary embodiment of the present invention. The projector 1 is an optical equipment that modulates a light beam emitted by a light source in accordance with image information to form an optical image and project the optical image on a screen in an enlarged manner, which includes a light source lamp unit 10 as a light source device, an integrator illumination optical system 20, a color-separating optical system 30, a relay optical system 35, an optical device 40 and a projection optical system 50, optical elements of the optical systems 20 to 35 being positioned and accommodated in an optical component casing 2 in which a predetermined illumination optical axis X is set.

Although the projector 1 has a plurality of fans 61, 62 and 63 constituting a cooling mechanism for the light source lamp unit 10 and the optical systems 20 to 35, the explanation is omitted herein.

The light source lamp unit 10 irradiates a light beam emitted by a light source lamp 11 after converging at a predetermined position to illuminate the optical device 40. The light source device 10 includes the light source lamp 11, an ellipsoidal reflector 12, a sub-reflection mirror 13 and a parallelizing concave lens 14 (details described below).

The light beam emitted by the light source lamp 11 is irradiated toward the front side of the device as a convergent light by the ellipsoidal reflector 12, which is parallelized by the parallelizing concave lens 14 and irradiated toward the integrator illumination optical system 20.

The integrator illumination optical system 20 splits the light beam irradiated by the light source lamp unit 10 into a plurality of sub-beams to integrate an in-plane luminance of an illumination area, which includes a first lens array 21, a second lens array 22, a polarization beam splitter ("PBS") array 23, a condenser lens 24 and a reflection mirror 25.

The first lens array 21 is a light-beam splitting optical element for splitting the light beam irradiated by the light source lamp 11 into a plurality of sub-beams, which includes a plurality of small lenses arranged in a matrix in a plane orthogonal to the illumination optical axis X, the profile of the respective small lenses being substantially similar to the shape of each image formation area of liquid crystal panels 42R, 42G and 42B of the optical device 40 (described below).

The second lens array 22 is an optical element for condensing the plurality of sub-beams split by the first lens array 21 and also includes a plurality of small lenses arranged in a matrix in a plane orthogonal to the illumination optical axis X in the same manner as the first lens array 21. However, since the second lens array 22 is for condensing the light beams, it is not necessary that the profile of the respective small lenses thereof corresponds to the profile of the image formation area of the liquid crystal panels 42R, 42G and 42B.

The PBS array 23 is a polarization-converting element for aligning the polarization direction of the respective sub-beams split by the first lens array 21 into a uniform linear polarization.

Though not illustrated, the PBS array 23 has an alternating arrangement of polarization separating films and reflection mirrors inclined relative to the illumination optical axis X. The polarization separating film transmits one of P polarized light beam and S polarized light beam contained in the respective sub-beams and reflects the other polarized light beam. The reflected polarized light beam is bent by the reflection mirror and is irradiated in the irradiation direction of the transmitted polarized light beam, i.e. along the illumination optical axis X. Either one of the irradiated polarized light beams is polarization-converted by a phase plate provided on the light-irradiation surface of the PBS array 23 so that the polarization direction of all of the polarized light beams are aligned. With the use of the PBS array 23, the light beam irradiated by the light source lamp 11 can be aligned in a single polarized light beam, thereby enhancing the utilization ratio of the light source beam used in the optical device 40.

The condenser lens 24 is an optical element for condensing the plurality of sub-beams having passed through the first lens array 21, the second lens array 22 and the PBS array 23 to superpose the sub-beams on the image formation area of the liquid crystal panels 42R, 42G and 42B. The condenser lens 24 is a spherical lens having a flat surface on the incident-side of the light-transmission area and a spherical surface on the irradiation side in the present exemplary embodiment, but may alternatively be an aspherical lens having hyperboloid irradiation surface.

The light beam irradiated by the condenser lens 24 is bent by the reflection mirror 25 to be irradiated to the color-separating optical system 30.

The color-separating optical system 30 has two dichroic mirrors 31 and 32, and a reflection mirror 33, which separates the plurality of sub-beams irradiated from the integrator illumination optical system 20 by the dichroic mirrors 31 and 32 into three color lights of red (R), green (G) and blue (B).

The dichroic mirrors 31 and 32 are optical elements having a substrate on which a wavelength-selection film that reflects a light beam of a predetermined wavelength and transmits a light beam of the other wavelength is formed, in which the dichroic mirror 31 disposed on the upstream of the optical path is a mirror that transmits the red light and reflects the other color lights. The dichroic mirror 32 disposed on the downstream of the optical path is a mirror that reflects the green light and transmits the blue light.

The relay optical system 35 has an incident-side lens 36, a relay lens 38, and reflection mirrors 37 and 39, which guides the blue light transmitted through the dichroic mirror 32 of the color-separating optical system 30 to the optical device 40. Incidentally, the relay optical system 35 is used for the optical path of the blue light in order to avoid deterioration in the light utilization efficiency on account of light dispersion and the like caused by the longer length of the optical path of the blue light than the optical path of the other color light. Though such arrangement is used in the present exemplary embodiment because of the longer optical path of the blue light, the optical path of the red light may alternatively be lengthened.

The red light separated by the above-described dichroic mirror 31 is bent by the reflection mirror 33 and, subsequently, fed to the optical device 40 through a field lens 41. The green light separated by the dichroic mirror 32 is directly fed to the optical device 40 through the field lens 41. The blue light is condensed and bent by the lenses 36, 38 and the reflection mirrors 37 and 39 of the relay optical system 35 to be fed to the optical device 40 through the field lens 41. Incidentally, the field lenses 41 provided on the upstream of the respective color lights of the optical device 40 convert the respective sub-beams irradiated by the second lens array 22 into a light beam parallel to the illumination optical axis X.

The optical device 40 modulates the light beam incident thereon in accordance with image information to form a color image, which includes the liquid crystal panels 42 (42R, 42G, 42B) as an optical modulator to be illuminated and a cross dichroic prism 43 (a color-combining optical system). Incidentally, incident-side polarization plates 44 are interposed between the field lens 41 and the respective liquid crystal panels 42R, 42G and 42B and, though not illustrated, irradiation-side polarization plates are interposed between the respective liquid crystal panels 42R, 42G and 42B and the cross dichroic prism 43, the incident-side polarization plates 44, the liquid crystal panels 42R, 42G and 42B and the irradiation-side polarization plates modulating the respective incident color lights.

The liquid crystal panels 42R, 42G and 42B are constructed by sealing liquid crystal (electrooptic material) between a pair of transparent glass substrates, which modulates the polarization direction of the polarized light beam irradiated by the incident-side polarization plate 44 in accordance with given image signal using, for instance, polycrystalline silicon TFT as a switching element. The image formation areas of the liquid crystal panels 42R, 42G and 42B have rectangular profile having diagonal dimension of, for instance, 0.7 inch.

The cross dichroic prism 43 combines the optical image irradiated by the irradiation-side polarization plate and modulated for each color light to form a color image. The cross dichroic prism 43 has a square shape in plane view with four right-angle prisms attached with each other, and dielectric multi-layered films are formed on the boundaries adhering the respective right-angle prisms. One of the multi-layered films arranged in approximately X-shape reflects the red light and the other multi-layer film reflects the blue light, the multi-layered films bending the red light and the blue light to be aligned with the advancing direction of the green light, thereby combining the three color lights.

The color image irradiated by the cross dichroic prism 43 is projected by the projection optical system 50 in an enlarged manner to form a large-size image on a screen (not shown).

Figure 2:
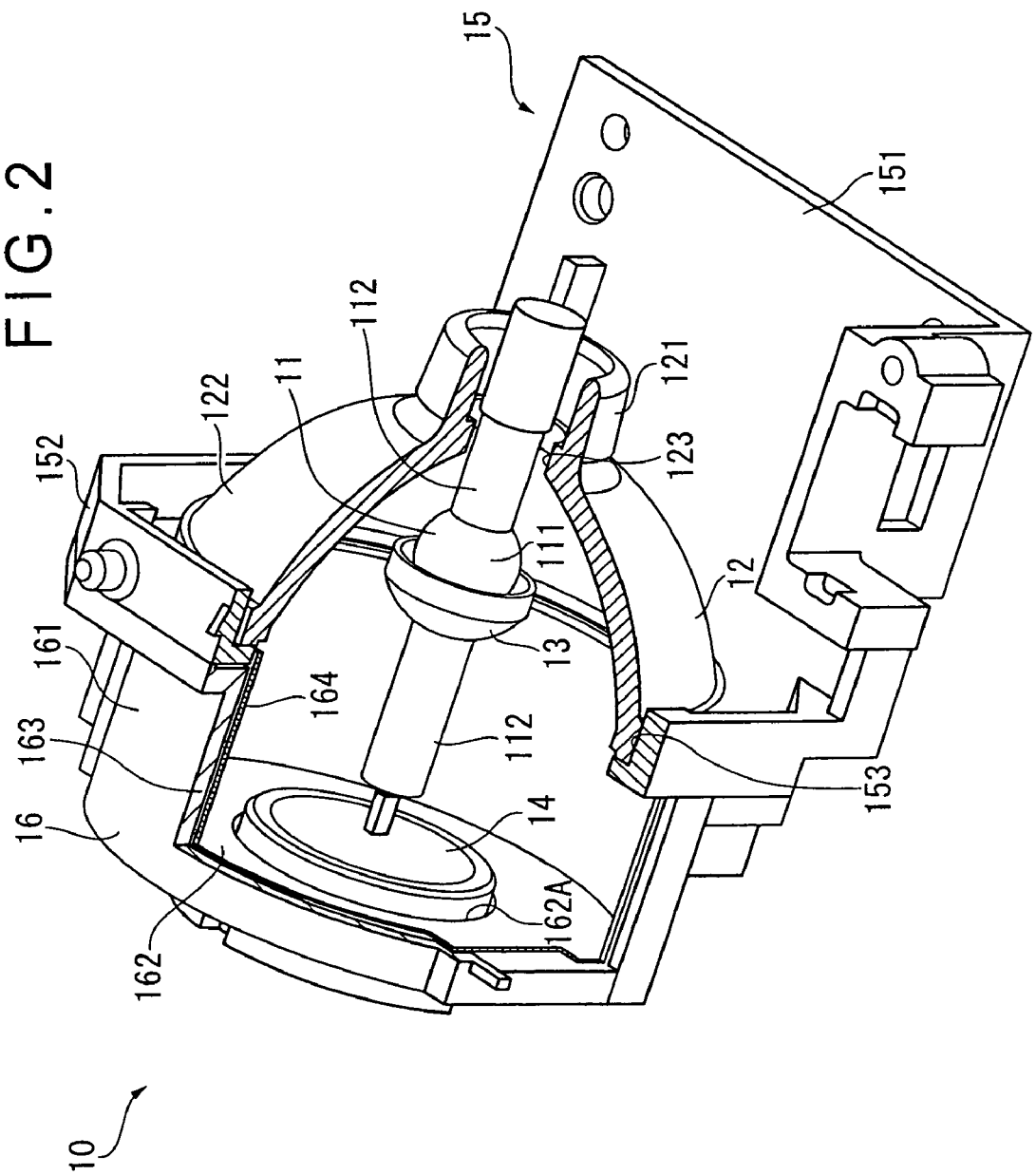
FIG. 2 is a schematic showing a light source lamp unit of the aforesaid exemplary embodiment.
Figure 3:
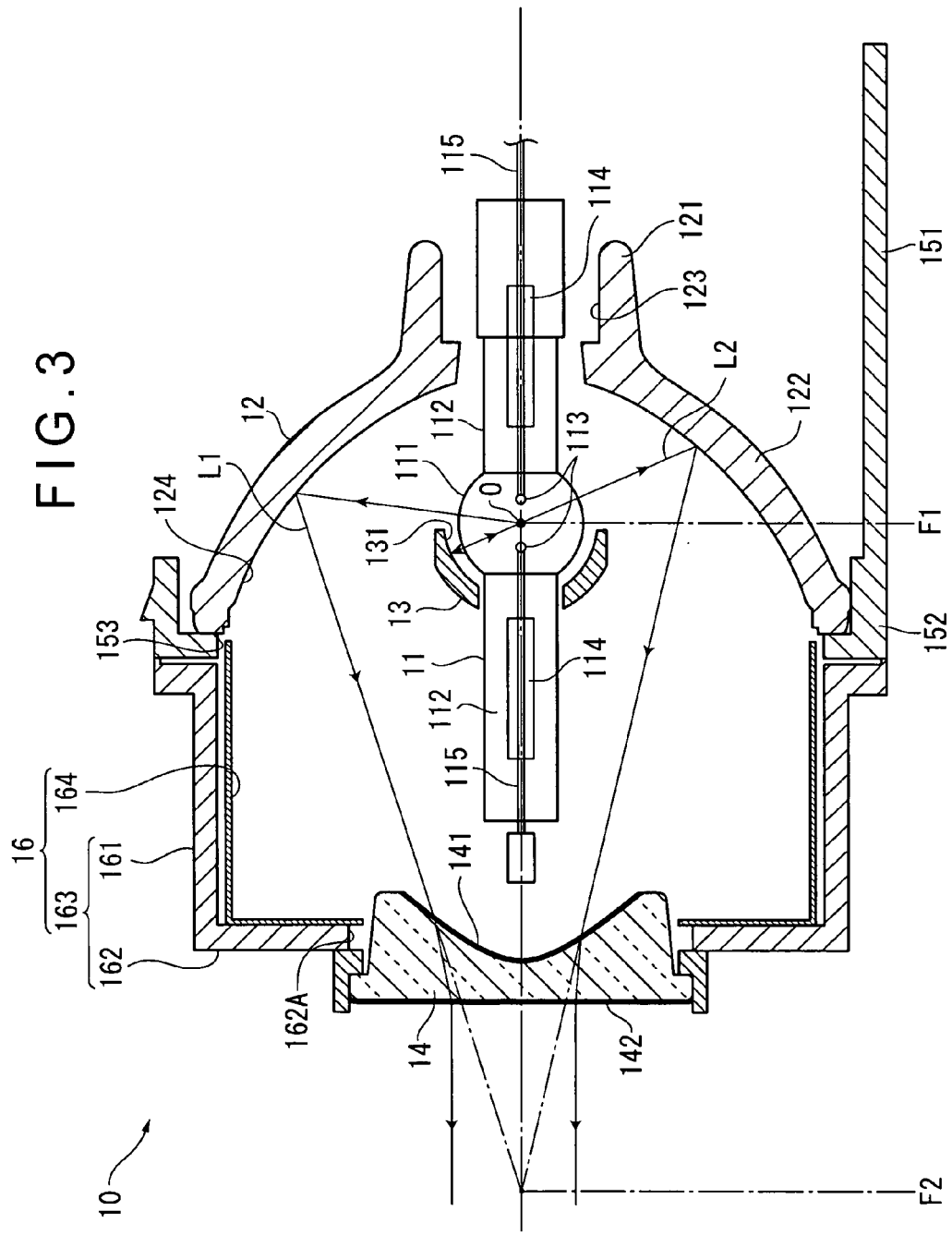
FIG. 3 is a cross-section schematic showing the light source lamp unit of the aforesaid exemplary embodiment.
Figure 4:
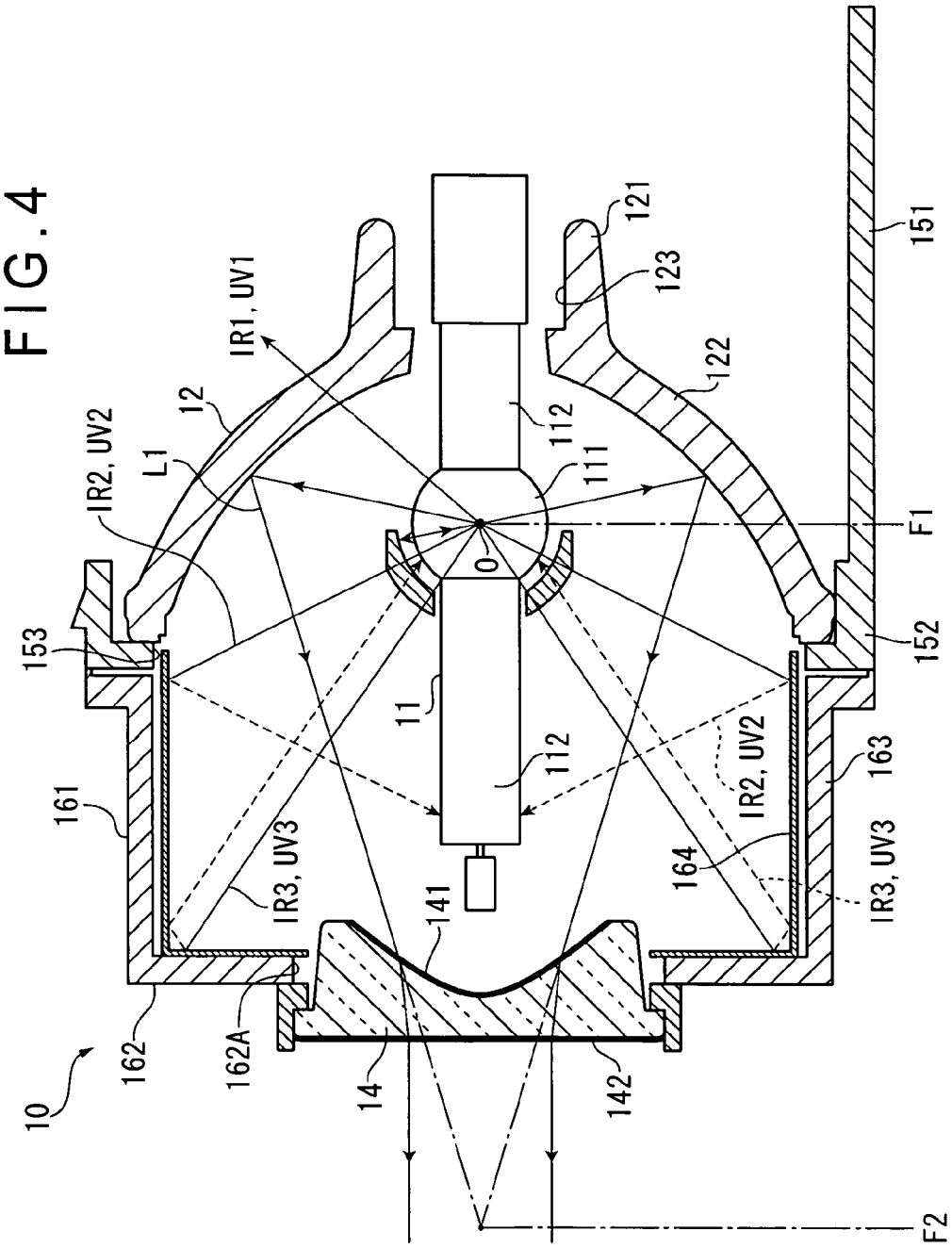
FIG. 4 is a cross-section schematic showing the light source lamp unit of the aforesaid exemplary embodiment.

FIG. 2 shows the light source lamp unit 10 seen diagonally from the back side, and FIGS. 3 and 4 are a cross-section schematics of the light source lamp unit 10.

The light source lamp unit 10 includes a holder 16 and a lamp housing 15 in addition to the above-described light source lamp 11, ellipsoidal reflector 12, sub-reflection mirror 13 and parallelizing concave lens 14.

The light source lamp 11 as a light-emitting tube is constituted with a silica glass tube with the central portion thereof being spherically bulged, the central portion being a light-emitting portion 111 and the portions extending on both sides of the light-emitting portion 111 being sealing portions 112.

As the light source lamp 11, any of a metal halide lamp, high pressure mercury lamp, or super high pressure mercury lamp is employed, and the lamp emits light with high intensity by including strong ultraviolet ray.

As illustrated in FIG. 3, a pair of tungsten electrodes 113 spaced apart by a predetermined distance, mercury, rare gas and a small quantity of halogen are sealed inside the light-emitting portion 111.

Molybdenum-made metal foils 114 electrically connected with the electrodes 113 of the light-emitting portion 111 is inserted into the sealing portions 112, which are sealed by glass material etc. When a predetermined voltage is applied to the lead wire 115 connected to the metal foils 114, electric discharge is generated between the pair of electrodes 113 so that the light-emitting portion 111 emits light.

The ellipsoidal reflector 12 is a silica glass integral molding having a neck portion 121 to which the sealing portion 112 of the light source lamp 11 is inserted and a reflecting portion 122 of ellipsoidal curved surface extending from the neck portion 121.

An insertion hole 123 is formed at the center of the neck portion 121, and the sealing portion 112 is disposed at the insertion hole 123.

On the ellipsoidal curved glass surface of the reflecting portion 122, a reflecting surface 124 (FIG. 3) is constructed with a dielectric multi-layer film as a reflection enhancing film coated by vapor deposition of thin metal film. For heat resistance, the reflecting surface 124 should preferably be constructed with alternate layers of tantalum compound and $SiO_2$, hafnium compound and $SiO_2$, etc.

Also, the reflecting surface 124 is provided with a cold mirror that reflects the visible light and transmits the infrared ray and the ultraviolet ray.

The light source lamp 11 is disposed inside the reflecting portion 122 so that the light-emitting center O (FIG. 3) between the electrodes 113 inside the light-emitting portion 111 is positioned at a first focus F1 of the ellipsoidal curved surface of the reflecting surface 124.

When the light source lamp 11 is lit, the light beam emitted by the light-emitting portion 111 is reflected by the reflecting surface 124 to be a convergent light converging at a second focus F2 of the ellipsoidal curved surface as shown in FIG. 3.

In order to fix the light source lamp 11 to the ellipsoidal reflector 12, the sealing portion 112 of the light source lamp 11 is inserted to the insertion hole 123 of the ellipsoidal reflector 12 so that the light-emitting center O between the electrodes 113 in the light-emitting portion 111 is located at the focus of the ellipsoidal curved surface of the reflecting surface 124, and inorganic adhesive having silica and alumina as main components is filled in the insertion hole 123.

The dimension of the reflecting portion 122 in the optical axis direction is shorter than the length of the light source lamp 11 so that the front sealing portion 112 on the front side of the light source lamp 11 in the light-irradiation direction protrudes from the light-irradiation opening of the ellipsoidal reflector 12 when the light source lamp 11 is fixed to the ellipsoidal reflector 12 as described above.

As shown in FIG. 3, the sub-reflection mirror 13 is a reflecting member covering substantially the front half of the light-emitting portion 111 of the light source lamp 11 in the light-irradiation direction, the sub-reflection mirror 13 being made of, for example, a low thermal expansion material such as silica glass or Neoceram or a high heat-conductive material such as light-transmissive alumina, sapphire, quartz crystal, fluorite and yittrium aluminum garnet ("YAG").

A reflecting surface 131 of the sub-reflection mirror 13 is so formed to have a curved concave surface corresponding to a spherical surface of the light-emitting portion 111, on which a dielectric multi-layer film as a reflection enhancing film is coated as with the reflecting surface 124 of the ellipsoidal reflector 12. The reflecting surface 131 is also constructed with a cold mirror that only reflects the visible light and transmits the infrared ray and the ultraviolet ray.

As for the light beam irradiated by the light source lamp 11, as shown in FIG. 3, a light beam L1 being incident on the ellipsoidal reflector 12 out of the light beams irradiated by the light-emitting center O of the light emitting portion 111 is reflected by the reflecting surface 124 of the ellipsoidal reflector 12 and irradiated toward the second focus F2.

On the other hand, a light beam L2 irradiated by the light-emitting center O of the light-emitting portion 111 toward the opposite side of the ellipsoidal reflector 12 is reflected by the reflecting surface 131 of the sub-reflection mirror 13 toward the ellipsoidal reflector 12, and further reflected by the reflecting surface 124 of the ellipsoidal reflector 12. Then, the light beam L2 is irradiated from the ellipsoidal reflector 12 to be converged at the second focus F2.

In short, by providing the sub-reflection mirror 13, the light beam irradiated by the light-emitting portion 111 toward the opposite side (front side) of the ellipsoidal reflector 12 can be converged at the second focus F2 of the ellipsoidal reflector 12 as with the light beam being directly incident on the reflecting surface 124 of the ellipsoidal reflector 12 from the light source lamp 11.

Conventionally, since the sub-reflection mirror 13 was not provided, the light beam irradiated by the light source lamp 11 needed to be converged at the position of the second focus F2 only by the ellipsoidal reflector 12 so that the opening of the ellipsoidal reflector 12 needed to be expanded.

However, by providing the sub-reflection mirror 13, since the light beam irradiated by the light source lamp 11 toward the opposite side of the ellipsoidal reflector 12 (front side in the light-irradiation direction) can be reflected by the sub-reflection mirror 13 so as to be incident on the reflecting surface 124 of the ellipsoidal reflector 12, almost all the light beam irradiated by the light-emitting portion 1111 can be converged at a predetermined position even if the ellipsoidal curved surface of the reflecting surface (i.e. reflecting portion 122) is small. Thus, the length of the ellipsoidal reflector 12 in the optical axis direction and its opening can be reduced in size. Accordingly, the light source lamp unit 10 and the projector can be downsized and layout of the light source lamp unit 10 to be incorporated in the projector 1 can be facilitated.

Further, by providing the sub-reflection mirror 13, even if the first focus F1 and the second focus F2 of the ellipsoidal reflector 12 are positioned closer to each other to make the diameter of a light condensing spot at the second focus F2 smaller, almost all the light beam irradiated from the light-emitting portion 111 is converged at the second focus by the ellipsoidal reflector 12 and the sub-reflection mirror 13 to be available, and thus the light utilization efficiency can be greatly enhanced.

Therefore, the light source lamp 11 with relatively low output can be employed, and thus temperature of the light source lamp 11 and the light source lamp unit 10 can be lowered.

The lamp housing 15 is an integral molding having substantially L-shaped cross section made of synthetic resin, which has a horizontal section 151 and a vertical section 152.

The horizontal section 151 is engaged with a wall of the optical component casing 2 to prevent light leakage by hiding the light source lamp unit 10 in the optical component casing 2. Further, although not illustrated, a terminal block for electrically connecting the light source lamp 11 with an external power source is provided on the horizontal section 151, the terminal block being connected with the lead wire 115 connected with the light source lamp 111.

The vertical section 152 is for determining the position of the ellipsoidal reflector 12 in the optical axis direction, to which a distal end of the ellipsoidal reflector 12 on the light-irradiation opening is fixed by mechanical pressing, an adhesive etc. An opening portion 153 is formed on the vertical section 152 along an edge of the ellipsoidal reflector 12 on the light-irradiation opening.

Projections and dents are provided for the horizontal section 151 and the vertical section 152 and these projections and dents are respectively engaged with projections and dents formed in the optical component casing 2 so that the light-emitting center O of the light source lamp 11 is disposed on the illumination optical axis X of the optical component casing 2.

The parallelizing concave lens 14 parallelizes the light beam irradiated by the light source lamp 11, of which a light beam incident side 141 has an aspherical (hyperboloid, for instance) concave surface and a light beam irradiation side 142 has a flat surface as shown in FIG. 3. Dimension of the thinnest part of the parallelizing concave lens 14 along the light transmission direction, i.e. between the part of the concave surface most dented toward the light beam irradiation side 142 side and the light beam irradiation side 142, is 2 mm or more, for instance, 3 mm.

An anti reflection coating (AR coating) is formed on the light beam incident side 141 of the parallelizing concave lens 14. Accordingly, the light utilization efficiency can be enhanced. An ultraviolet protection film is formed on the light beam irradiation side 142 of the parallelizing concave lens 14. The ultraviolet protection film reflects the ultraviolet ray to avoid the transmission of the ultraviolet ray, and thereby, irradiation of the ultraviolet ray from the light source lamp unit 10 can be prevented.

The holder 16 has a cylindrical shape corresponding to the light irradiation opening of the ellipsoidal reflector 12, which is bonded and fixed to the vertical section 152 from the opposite side of the ellipsoidal reflector 12 to hold an outer periphery of the parallelizing concave lens 14.

The holder 16 has a double structure having a holder body 163 provided on the outer side and an absorber 164 provided on the inner side thereof.

The outer holder body 163 is a synthetic resin molding made of poly phenylene sulfide (PPS), Vectra (LCP), or the like, which is constituted with an integrally-molded cylinder portion 161 and a holding portion 162. The cylinder portion 161 covers the light source lamp 11 thereinside. The holding portion 162 is so provided as to close light-irradiation side of the cylinder portion 161, on which an opening 162A is formed for the parallelizing concave lens 14 to be engaged therewith.

As described above, the sealing portion 112 of the light source lamp 11 protrudes forward from the ellipsoidal reflector 12 in the light-irradiation direction, the protruded sealing portion 112 being covered with the holder 16.

The inner absorber 164 can be made of variety of materials capable of shielding the light from the light source lamp 11 toward the holder body 163 and absorbing lights with low reflectivity. In order to carry the light-shielding property while keeping the low reflectivity, for instance, the absorber 164 should employ a metal plate as a substrate made of aluminum, magnesium, titanium, iron, copper, or alloys thereof, the inner surface of which can be processed with black-aluminum treatment or roughed by chemical machining or etching.

The reflectivity of a pure substrate of aluminum is approximately 80%, but the reflectivity can be kept to be 20% or less by the black-aluminum treatment, so that the light beam being incident on the absorber 164 can be securely absorbed and shielded.

By the corrosion resistivity and light-absorbing capability based on the black-aluminum treatment for the absorber 164, the holder body 163 is protected, so that the thermal deterioration and generation of harmful gases like siloxane can be avoided.

Also, since the absorber 164 allows the holder 16 to have thermal resistance as a whole, choices of materials for the holder body 163 can be broadened, which results in reducing size and cost, and facilitating molding of the holder body 163.

As described above, only visible light out of the light from the light source lamp 11 is reflected by the ellipsoidal reflector 12 and the sub-reflection mirror 13 and converged at the second focus F2, which is different from the infrared ray and the ultraviolet ray included in the infrared ray and the ultraviolet ray.

As shown in FIG. 4, the infrared ray IR1 and the ultraviolet ray UV1 irradiated from the light source lamp 11 toward the ellipsoidal reflector 12 passes through a base material of the ellipsoidal reflector 12 from the reflecting portion 122 to be irradiated toward the outside of the light source lamp unit 10. Thereby, heat escapes to the back side of the reflecting portion 122 of the ellipsoidal reflector 12, and thus the light source lamp 11 can be protected from the infrared ray and the ultraviolet ray which are heat rays. The infrared ray IR1 and the ultraviolet ray UV1 passed through the ellipsoidal reflector 12 is shielded by the optical component casing 2 covering the light source lamp unit so as not to leak toward the outside.

On the other hand, the infrared rays IR2 and IR3 irradiated toward the side of sub-reflection mirror 13 from the light source lamp 11 passes through the sub-reflection mirror 13, but the irradiation direction is covered with the holder 16. Therefore, the infrared rays IR2 and IR3 are not leaked to the outside.

Most of the infrared rays IR2 and IR3 shielded by the holder 16 are absorbed by the absorber 164 provided on the inner side of the holder 16, and reflection can be sufficiently reduced.

Hereinafter, light irradiated from the light-emitting portion 111 is described. As generally known, arc generated between the pair of electrodes 113 in the light source lamp 11 irradiates light having axisymmetric light distribution spreading in a direction orthogonal to the axial direction of the electrodes 113 from the center point between the electrodes 113. In this light distribution, it is common that an energy of the light irradiated from the center of the arc generated between the electrodes 113 toward the direction orthogonal to the axial direction of the electrodes 113 is big, while the energy of the irradiated light becomes smaller as the light irradiation direction inclines toward the direction parallel to the axial direction of the electrodes 113. Accordingly, because of the light distribution, in the infrared rays transmitted through the sub-reflection mirror 13 and absorbed by the absorber 164, the light energy of the infrared ray IR2 is higher than that of the infrared ray IR3. In other words, since thermal absorption of the infrared ray IR2 at the absorber 164 can prevent the infrared ray IR2 having high light energy from overheating the sealing portion 112, temperature rise at the sealing portion 112 can be greatly restrained and thus the temperature can be efficiently lowered.

As shown in FIG. 4, even if the infrared ray IR3 transmitted through the sub-reflection mirror 13 cannot be sufficiently absorbed by the absorber 164 of the holding portion 162, on which the infrared ray IR3 is first incident, and rest of the light is reflected toward the cylinder portion 161, it can be sufficiently absorbed by the absorber 164 of the cylinder portion 161. Therefore, since most of the light reflection toward an area near the light-emitting portion 111 as a heat generating portion can be eliminated, temperature of the light-emitting portion 111 can also be lowered.

As described above, temperature of the light source lamp 11 is uniformly lowered, and thus the lifetime of the lamp can be increased.

The sub-reflection mirror 13 also transmits the ultraviolet ray. The ultraviolet rays UV2 and UV3 are also transmitted through the sub-reflection mirror 13 and absorbed by the absorber 164 in a manner substantially same with the infrared rays IR2 and IR3, overheating problem of the light source lamp 11 can be solved. Although many ultraviolet rays are irradiated from the light source lamp 11 of the present exemplary embodiment, the heat is absorbed by the absorber 164 as with the infrared rays described above, the effect for lowering temperature of the light source lamp 11 can be improved.

On the other hand, in a case that the light source lamp unit 10 is forcibly cooled by air sent by a fan in the cooling mechanism, an intake port 90 is formed on one side of the cylinder portion 161 of the holder 16 and an exhaust port 95 is provided at a position corresponding to the intake port 90 on the other side by cutting off a rectangular portion from the holder body 163 and the absorber 164. However, as described above, since temperatures of the light source lamp 11 and the light source lamp unit 10 have been sufficiently lowered, the temperature can be further lowered only by blowing the cooling air from the outside of the light source lamp unit 10 through the intake port 90 and exhausting the air to the exhaust port 95, and noise is not generated.

Nets (not shown) are provided at the intake port 90 and the exhaust port 95, so that broken pieces of the lamp do not scatter when the light source lamp 11 blows out.

In short, temperature of the light source lamp 11 can be restrained from rising and lowered in accordance with the light absorption (i.e. light reflectivity) of the absorber 164. The light reflectivity of the absorber 164 may be appropriately set in accordance with types, output, etc. of the light source lamp 11 or with shape, etc. of the ellipsoidal reflector 12.

2. Second Exemplary Embodiment

Next, a second exemplary embodiment of the present invention will be described below.

Incidentally, in the following description, the same reference numeral will be attached to the same configuration as the above-described exemplary embodiment to omit or to simplify the description thereof.

In the first exemplary embodiment, temperature of the light source lamp 11 is lowed by the light absorption by the absorber 164.

In the second exemplary embodiment, in addition, the external air is introduced into the light source lamp unit 10 by a fan, and the external air also helps to lower temperature of the light source lamp 11. The configuration will be described below in detail.

Figure 5:
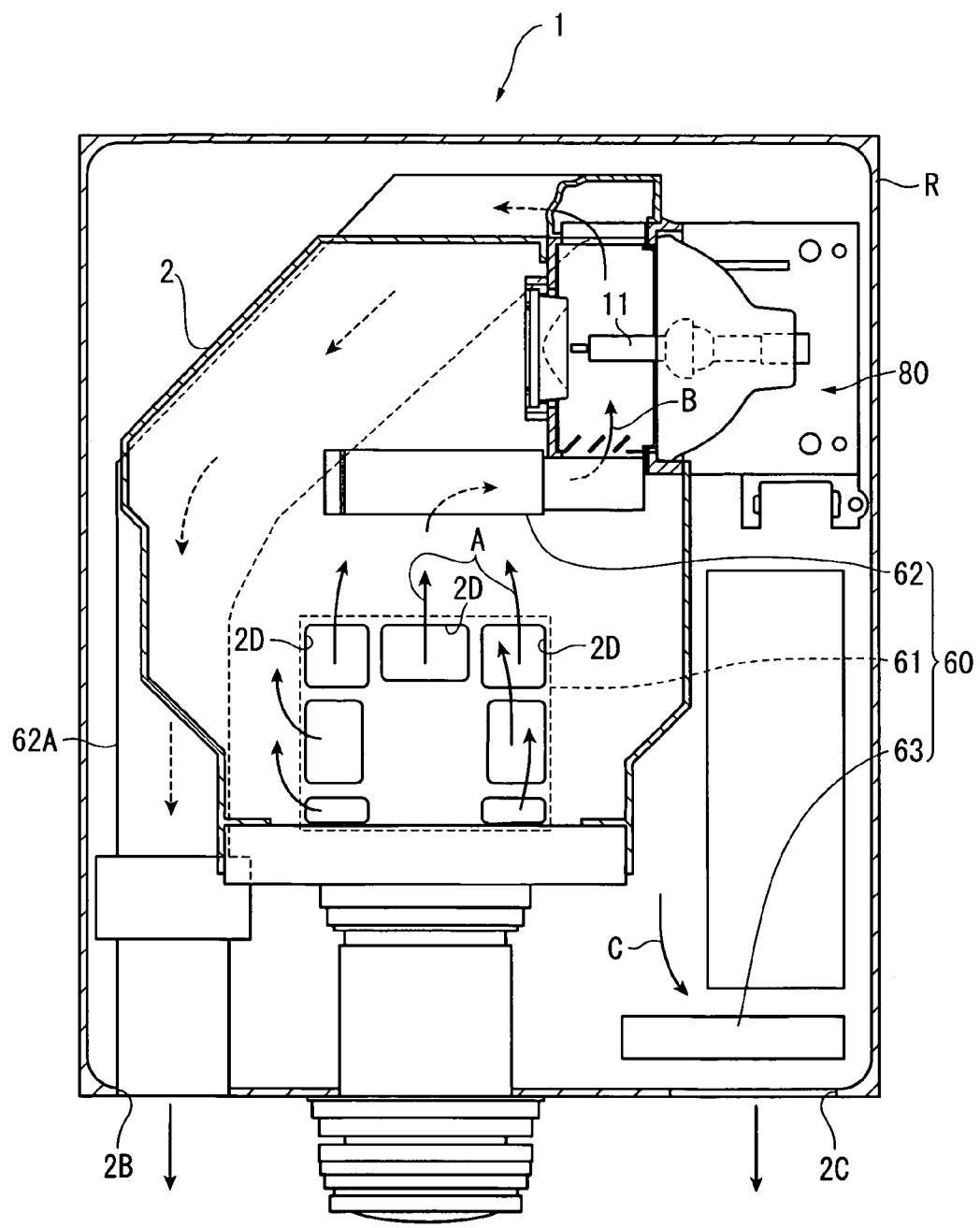
FIG. 5 is a plan view schematically showing a structure of a projector according to a second exemplary embodiment of the present invention.

FIG. 5 is a schematic plan view showing a structure of the projector 1 according to the present exemplary embodiment.

A configuration of the cooling mechanism is a feature of the present exemplary embodiment, though the description is omitted in the above exemplary embodiment. The projector 1 includes a cooling unit 60 for discharging heat generated in the casing R to the outside.

The casing R of the projector 1 has exhaust ports 2B and 2C on its front side for exhausting the air inside the projector 1. An intake port (not illustrated) is also provided on the bottom side at a position corresponding to the optical device 40 for introducing the cooling air from the outside.

The cooling unit 60 cools inside the projector 1 by supplying the cooling air into a flow path in the projector 1, making the supplied cooling air absorb the heat generated in the projector 1, and discharging the heated cooling air to the outside. The cooling unit 60 includes an axial-flow intake fan 61, a sirocco fan 62, and an axial-flow exhaust fan 63.

The sirocco fan 62 is disposed at a position diagonally opposite to a light source lamp unit 80 from the front side of the light-irradiation direction along the lateral side of the light source lamp unit 80.

Although not shown in detail, the sirocco fan 62 is a centrifugal fan having a drive motor, a multi-blade member tilting and bending forward as a rotary blade pivoted by the drive motor, and a casing for accommodating them, and an intake port 621 (FIG. 6) is provided at a position corresponding to a rotary surface and an discharge hole 622 (FIG. 6) is provided at an outer periphery of the rotary surface.

The cooling air introduced through the intake port 621 is agitated by the forward-bended multi-blade member to be discharged from the discharge hole 622 so as to be spread outwardly by the centrifugal force.

The axial-flow exhaust fan 63 is disposed between the exhaust port 2C formed on the front side of the casing R and a power source unit (not shown) for supplying electric power supplied from the outside to the light source lamp unit 80, the optical device 40, the cooling unit 60, etc.

First, the cooling mechanism of an air-cooling type provided to the projector 1 is described. The projector 1, as shown in FIG. 5, includes an optical device cooling system A for mainly cooling the optical device 40 (FIG. 1), an light source cooling system B for mainly cooling the light source lamp unit 10, and a power source cooling system C for mainly cooling the power source unit (not shown).

The optical device cooling system A includes an intake port (not shown) formed on the lower side of the casing R, the axial-flow intake fan 61 located above the intake port and the opening portion 2D formed above the axial-flow intake fan 61 on the bottom side of the optical component casing 2.

The fresh cooling air from the outside of the projector 1 is introduced through the intake port of the casing R by the axial-flow intake fan 61 and is sent into the optical component casing 2 through the opening portion 2D. Here, although not shown, a rectifying plate is provided on the lower side of the optical component casing 2, which rectifies the cooling air from the outside of the optical component casing 2 to flow from the downside to the upside.

As shown by an arrow in FIG. 5, the cooling air sent into the optical component casing 2 flows from the downside to the upside of the optical device 40 after being rectified, and further flows toward above the optical device 40 after passing through the front and back sides of the liquid crystal panels 42R, 42G and 42B.

As shown in FIG. 5, the light source cooling system B includes the sirocco fan 62, a duct 62A and the exhaust port 2B. In the light source cooling system B, the cooling air passed through the optical device cooling system A is sucked by the sirocco fan 62 and is sent into the light source lamp unit 80 to cool the light source lamp 11. Then, the cooling air comes out from the optical component casing 2 and passes through the duct 62A arranged under the optical systems 20 to 35 to be exhausted to the outside from the exhaust port 2B.

The cooling mechanism of the light source lamp unit 80 will be described later in more detail.

The power source cooling system C includes an axial-flow exhaust fan 63 provided near the power source unit and the exhaust port 2C. In the power source cooling system C, the heated air is sucked by the axial-flow exhaust fan 63 and exhausted from the exhaust port 2C. At this time, the air in the entire projector 1 is exhausted simultaneously so that the heat does not stay in the projector 1.

Next, the cooling mechanism of the light source lamp unit 80 is described.

Figure 6:
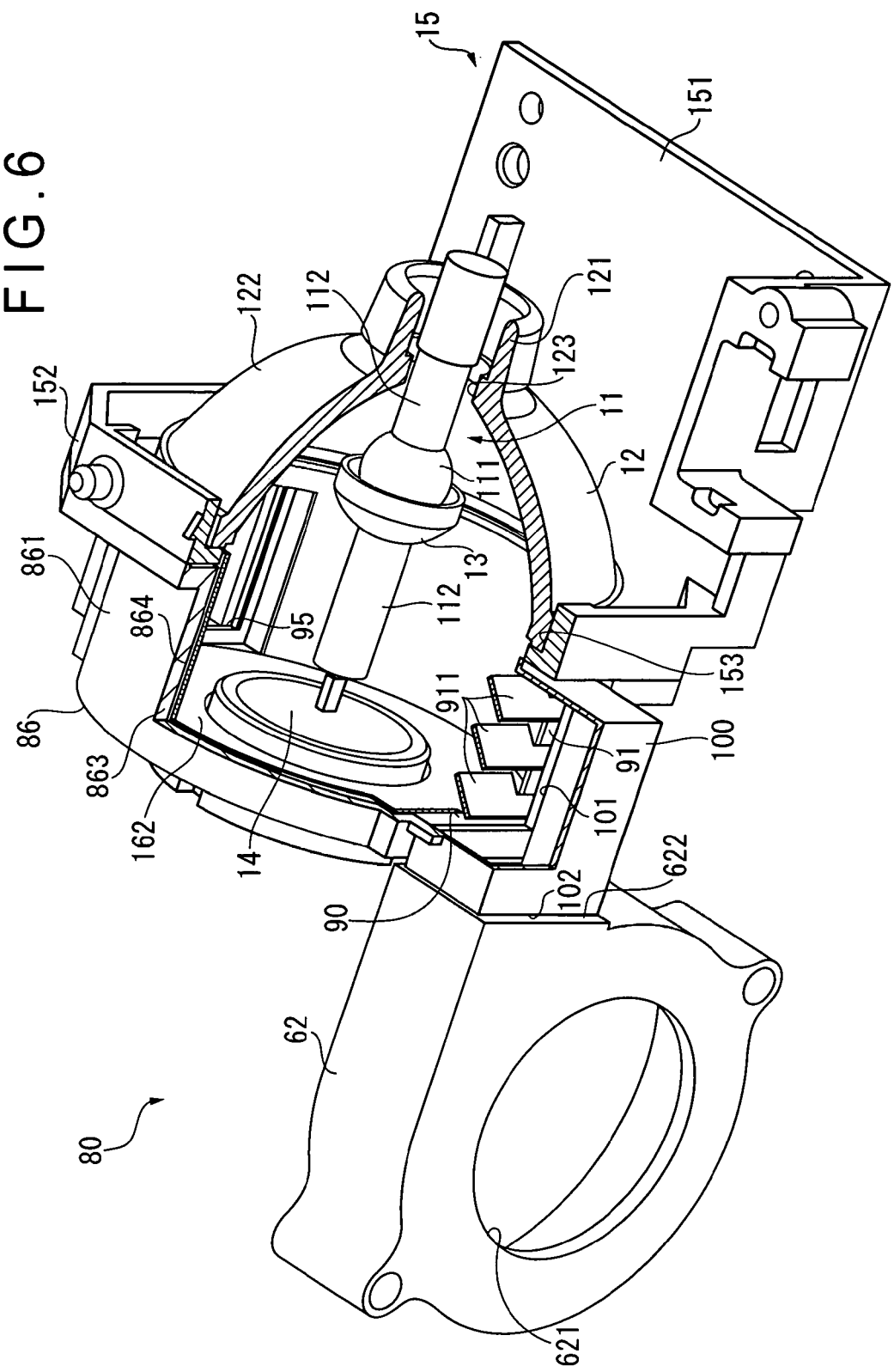
FIG. 6 is a schematic showing a light source lamp unit of the aforesaid exemplary embodiment.
Figure 7:
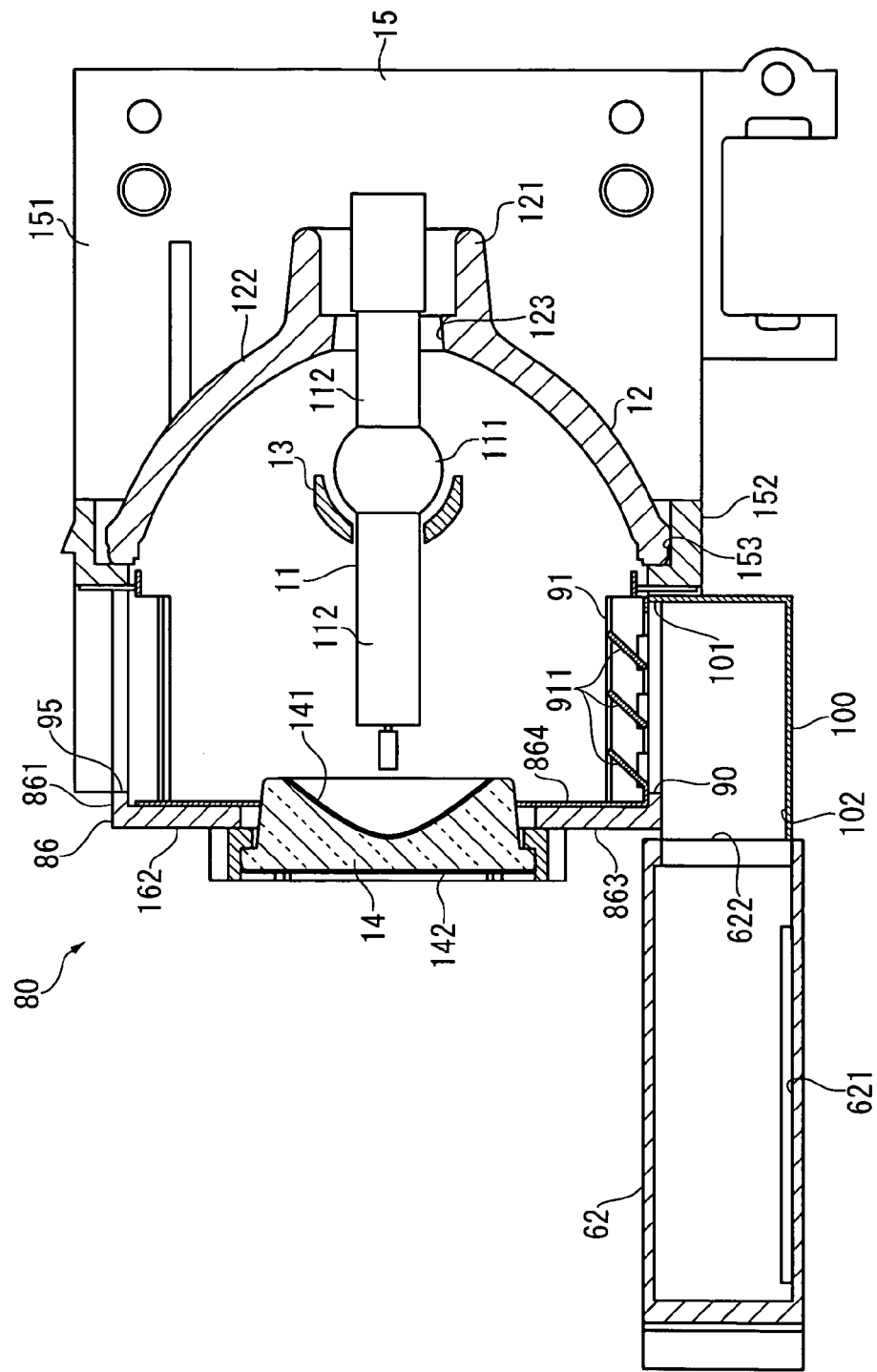
FIG. 7 is a cross-section schematic showing an upper side of the light source lamp unit of the aforesaid exemplary embodiment.

FIG. 6 is an illustration showing the light source lamp unit 80 with a part thereof being cut off. FIG. 7 is an illustration showing an upper side of the light source lamp unit 80.

The light source lamp unit 80 includes a holder 86. On a cylinder portion 861 of the holder 86, the intake port 90 is formed on one lateral side by cutting off a rectangular portion from a holder body 863 and an absorber 864, and the exhaust port 95 is formed on the other lateral side at a position corresponding to the intake port 90. The positions of the intake port 90 and the discharge hole 622 of the sirocco fan 62 are aligned on a straight line substantially parallel to the optical axis of the light source lamp unit 80, and the intake port 90 and the discharge hole 622 of the sirocco fan 62 are connected by a duct 100. The exhaust port 95 is connected to the duct 62A located below the optical systems 20 to 35 (FIG. 5).

The duct 100 is a synthetic resin molding having a box-like shape, and openings 101 and 102 are respectively formed on two sides orthogonal to each other to form a flow path of the cooling air. The duct 100 is provided along the intake port 90, and one opening 101 corresponds to the intake port 90 while the other opening 102 corresponds to the discharge hole 622 of the sirocco fan 62.

At a position of the intake port 90, a louver 91 having a plurality of vanes 911 is formed.

Each of the vanes 911 of the louver 91 is inclined against an opening side of the intake port 90, which rectifies the air introduced from the outside through the intake port 90 toward the light-emitting portion 111 and the sealing portion 112 at the side of the reflecting portion 122, thereby improving the cooling efficiency.

Each of the vanes 911 is made into a cut piece formed integrally with the absorber 864 by a press cut working method of the absorber 864, so that the absorber 864 likely heated by the light absorption heat can be cooled as well as the vanes 911 when the cooling air passes through the louver 91.

In addition, since each of the vanes 911 is made of the same material as the absorber 864, the light can also be shielded at the louver 91.

As for the flow of the cooling air, as shown in FIG. 7, the cooling air around the optical device 40 is introduced through the intake port 621 by the rotation of the sirocco fan 62, and discharged from the discharge hole 622 into the duct 100. The cooling air sent into the duct 100 is blown against the light-emitting portion 111 and the sealing portion 112 of the side of the reflecting portion 122 from the intake port 90 of the light source lamp unit 80 along the vanes 911, and the air exhausted from the exhaust port 95 is exhausted to the outside through the duct 62A (FIG. 5).

The cooling air introduced into the intake port 90 through the duct 100 from the sirocco fan 62 is blown against the light-emitting portion 111 and the sealing portion 112 at the side of the reflecting portion 122. The cooling air is flowed in the above mentioned direction because, as described in the above exemplary embodiment, the temperature is restrained from rising and sufficiently lowered especially at an end of the sealing portion 112 protruding from the ellipsoidal reflector 12 due to the light absorption by the absorber 164 (864 in the present exemplary embodiment).

As described above, the cooling air introduced through the intake port 90 is flowed toward the light-emitting portion 111 and the sealing portion 112 at the side of the reflecting portion 122 by setting the inclination of the vanes 911 to guide the cooling air toward the light-emitting portion 111, so that temperature of the light source lamp 11 can be uniformly lowered more efficiently.

Moreover, when the cooling air passes through the louver 91, the light absorption heat of the absorber 864 is absorbed by the cooling air. Since the light irradiated from the light source lamp 11 can be sufficiently by the cooled absorber 864, temperature of the light source lamp 11 can be lowered, and consequently, temperature of the entire light source lamp unit 10 can be lowered.

3. Third Exemplary Embodiment

Next, a third embodiment of the present invention will be described below.

In the second exemplary embodiment, the duct 100 connecting the intake port 90 of the light source lamp unit 80 and the discharge hole 622 of the sirocco fan 62 is provided on the straight line substantially parallel to the optical axis of the light source lamp unit 80. In the present exemplary embodiment, a duct 180 differs from the duct 100 in its shape and attachment direction. The configuration will be described below in detail.

Figure 8:
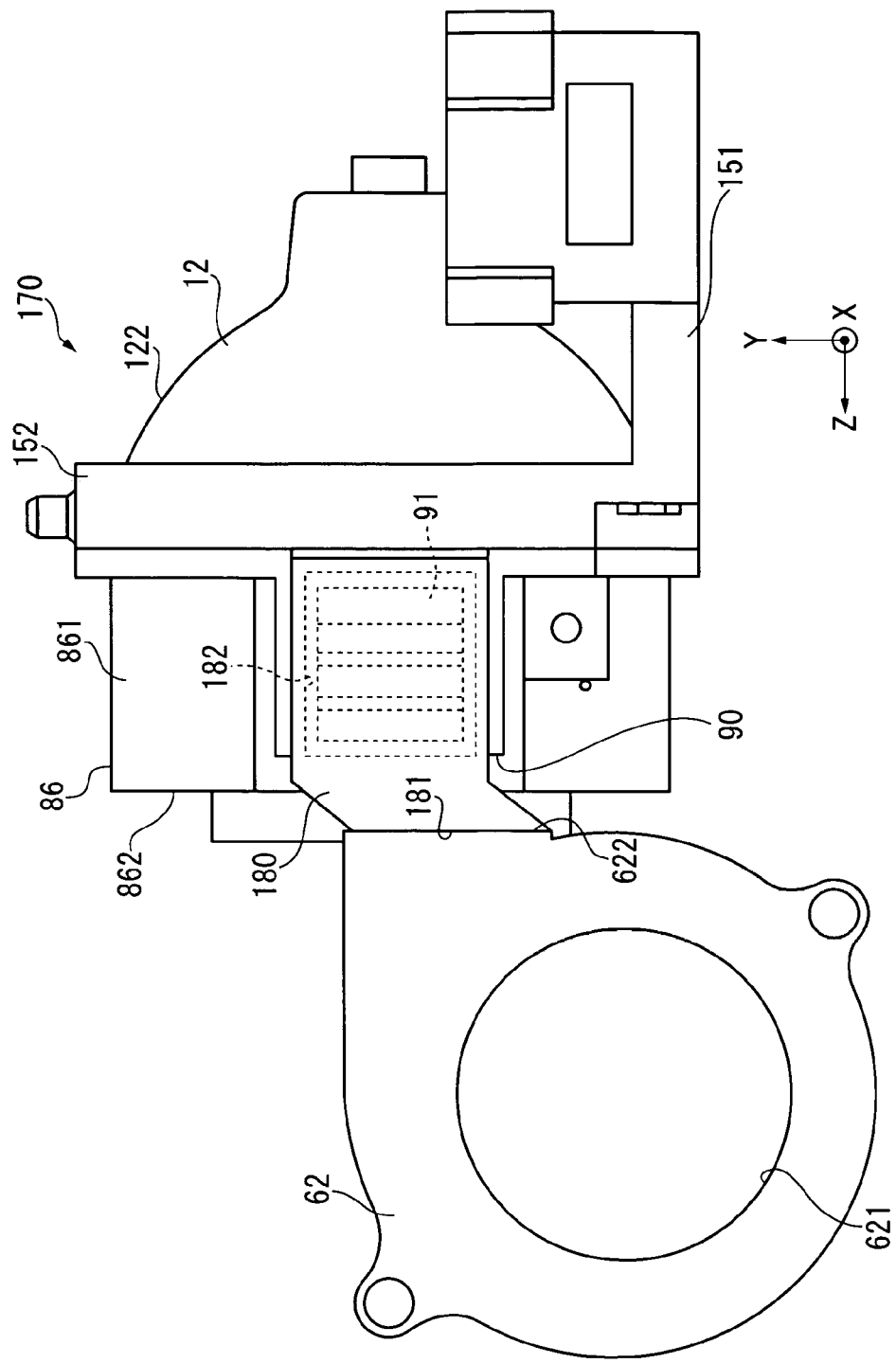
FIG. 8 is a schematic showing a light source lamp unit according to a third exemplary embodiment of the present invention.

FIG. 8 is a side view showing a light source lamp unit 170 of the present exemplary embodiment.

Positions of the intake port 90 of the light source lamp unit 170 and the discharge hole 622 of the sirocco fan 62 are not aligned on a straight line parallel to the optical axis of the light source lamp unit 170. The intake port 90 of the light source lamp unit 170 is disposed at a position corresponding to a spreading direction of the air discharged from the sirocco fan 62 (herein, above the discharge hole 622).

As in the above exemplary embodiment, the sirocco fan 62 is disposed at a position diagonally opposite to the light source lamp unit 170 from the front side of the light-irradiation direction along the lateral side of the light source lamp unit 170. Therefore, an extension of the flow path of the cooling air discharged from the discharge hole 622 through the duct 180 is along the inner circumferential surface of the absorber 864 corresponding to the upper side of the cylinder portion 861.

Due to the positional relationship between the light source lamp unit 170 and the sirocco fan 62, the duct 180 is provided obliquely between the discharge hole 622 and the intake port 90.

Thus, the air discharged from the sirocco fan 62 with the centrifugal force by rotation can smoothly flows into the duct 180 from one opening 181 while smoothly flowing along the inner circumferential surface of the cylinder portion 861 of the absorber 864 from the other opening 182 through the intake port 90.

In other words, losses of airflow volume and airflow pressure at the openings 181 and 182 being both ends of the duct can be restrained, so that the air can be blown against the inner circumferential surface of the absorber 864 from the sirocco fan 62. Since the cooling air flown along the inner circumferential surface of the absorber 864 is flown in a direction including the direction along the upper side of the absorber 864 (Y direction in FIG. 8), the heated air likely staying in the upper side can be cleared away by the cooling air. Thus, the cooling air flows and circulates from the downside to the upside of the ellipsoidal reflector 12, from the downside to the upside of the cylinder portion 861, and further from upside to the downside to be discharged to the outside of the light source lamp unit 170 from the exhaust port 95 (FIG. 6).

On the condition that the rectifying direction of the louver 91 in the intake port 90 is X direction, the inner circumferential surface of the absorber 864 is substantially along the Y direction. Therefore, flow of the air circulating along the inner circumferential surface of the cylinder portion 861 is not blocked by the louver 91.

Accordingly, the cooling air is blown against the inner circumferential surface with sufficient airflow, so that the absorber 864 can be sufficiently cooled even with its temperature rise caused by the absorption of the light irradiated from the light source lamp 11.

In other words, since the light irradiated from the light source lamp 11 can be sufficiently absorbed by the cooled absorber 864, which has an effect in further restraining the temperature rise and lowering temperature of the light source lamp 11.

The scope of the present invention is not restricted to the above-described embodiments, but includes following modifications.

In the above exemplary embodiments, although a metal halide lamp, a high pressure or a super high pressure mercury lamp is employed as the light-emitting tube, a halogen lamp, a xenon lamp or the like can also be employed. Temperature of the light-emitting tube employing such lamps can also be lowered by the present invention.

The absorber may be so configured to have anti-reflection and light absorption capabilities by roughing the surface by chemical machining or etching without limiting the black-aluminum treatment employed in the above exemplary embodiment.

The absorber is not limited to the metallic one, and ceramics and the like may also be employed.

The absorber does not have to be provided to the entire part of the holder body 163 as in the above exemplary embodiments. By providing the absorber to a predetermined area to which the light beam transmitted through the sub-reflection mirror is irradiated, temperature can be lowered substantially equally with the case providing the absorber to the entire part.

The front side of the ellipsoidal reflector in the light-irradiation direction may be closed with the holder.

In the above exemplary embodiments, a configuration in which the parallelizing concave lens 14 is provided to the light source lamp unit 10 is exemplified, but the configuration is not limited thereto, and a transparent member such as glass member can also be employed.

In the above exemplary embodiments, the sirocco fan 62 is employed for cooling the light source lamp unit 10, but an axial-flow fan may be employed, instead. In this case, a duct or an intake port of the light source device should preferably be in a shape and direction corresponding to the rotary shaft direction of the air blown out from the axial-flow fan.

Specific configuration and arrangement in implementing the present invention may be designed in any manner as long as an object of the present invention can be achieved.

Though the projector 1 using three liquid crystal panels 42R, 42G and 42B is taken as an example in the above exemplary embodiments, the present invention may be applied to a projector using a single liquid crystal panel, two liquid crystal panels or more than three liquid crystal panels.

Though the transmissive liquid crystal panel separately having a light-incident side and a light-irradiation side is used in the above exemplary embodiments, a reflective optical liquid crystal panel having common light-incident side and light-irradiation side may be used.

Though the liquid crystal panel is used as the optical modulator in the above exemplary embodiments, an optical modulator other than the liquid crystal panel such as a device using a micro-mirror may be used. In such case, the polarization plates at the light-incident side and the light-irradiation side can be omitted.

Though the front-type projector that projects an image in a direction from which a screen is observed taken as an example in the above exemplary embodiments, the present invention may be applied to a rear-type projector that projects an image in a direction opposite to the direction from which the screen is observed.

Though the light source device of the present invention is employed in a projector in the above exemplary embodiments, the light source device may be applied in other optical equipments.

The priority applications Nos. JP2004-054133, JP2004-264500 and JP2005-016217 upon which this patent application is based are hereby incorporated by reference.

What is claimed is:

1. A light source device, comprising:
a light-emitting tube including a light-emitting portion that generates a light beam by an electric discharge between electrodes and a pair of sealing portions respectively provided on both sides of the light-emitting portion;
an ellipsoidal reflector having a substantially ellipsoidal reflecting surface and reflecting a light beam irradiated by the light-emitting tube after converging at a predetermined position;
a sub-reflection mirror having a reflecting surface thereof being opposed to the reflecting surface of the ellipsoidal reflector and covering a front side of the light-emitting tube in the light-irradiation direction to reflect visible light of the light beam emitted by the light-emitting tube toward the ellipsoidal reflector and transmit the other light of the light beam;
a transparent member provided in front of the ellipsoidal reflector in the light-irradiation direction to transmit the light beam; and
a holder provided at a front end of the ellipsoidal reflector in the light-irradiation direction to hold an outer periphery of the transparent member,
wherein the holder has a double structure with an absorber for absorbing the other light transmitted through the sub-reflection mirror provided on an inner side thereof.

2. The light source device according to claim 1, wherein the holder has an intake port through which air is introduced and an exhaust port for exhausting the air.

3. The light source device according to claim 2, further comprising,
a fan to supply the air to the intake port, and
a louver provided in the intake port and having a plurality of vanes for rectifying the introduced air.

4. The light source device according to claim 3, wherein the absorber includes a substantially cylindrical cylinder portion, and
an airflow sent from the fan is introduced into the intake port of the holder in a direction along an inner circumferential surface of the absorber, and the airflow introduced through the intake port flows and circulates along an inner circumferential surface of the ellipsoidal reflector and/or the absorber.

5. The light source device according to claim 3, wherein the fan includes a discharge hole for discharging the airflow, and
the intake port of the holder and the discharge hole of the fan are connected by a duct.

6. The light source device according to claim 3, wherein the vanes are so disposed to incline against the light-emitting portion from the intake port with respect to an opening side of the intake port.

7. The light source device according to claim 3, wherein the vanes are formed integrally with the absorber as cut pieces formed by cutting and bending a part of the absorber.

8. The light source device according to claim 1, wherein one of the sealing portions protrudes forward from the ellipsoidal reflector in the light-irradiation direction, the protruding sealing portion being covered with the holder.

9. The light source device according to claim 1, wherein the double structure of the holder includes a holder body provided outside and the absorber provided inside of the holder body.

10. A projector that forms an optical image by modulating a light beam irradiated by a light source in accordance with image information and projects the optical image in an enlarged manner, comprising a light source device, the light source device comprising:
a light-emitting tube including a light-emitting portion that generates a light beam by an electric discharge between electrodes and a pair of sealing portions respectively provided on both sides of the light-emitting portion;

an ellipsoidal reflector having a substantially ellipsoidal reflecting surface and reflecting a light beam irradiated by the light-emitting tube after converging at a predetermined position;

a sub-reflection mirror having a reflecting surface thereof being opposed to the reflecting surface of the ellipsoidal reflector and covering a front side of the light-emitting tube in the light-irradiation direction to reflect visible light of the light beam emitted by the light-emitting tube toward the ellipsoidal reflector and transmit the other light of the light beam;

a transparent member provided in front of the ellipsoidal reflector in the light-irradiation direction to transmit the light beam; and a holder provided at a front end of the ellipsoidal reflector in the light-irradiation direction to hold an outer periphery of the transparent member, wherein the holder has a double structure with an absorber for absorbing the other light transmitted through the sub-reflection mirror provided on an inner side thereof.

11. The projector according to claim 10, wherein the holder has an intake port through which air is introduced and an exhaust port for exhausting the air.

12. The projector according to claim 11, further comprising, a fan to supply the air to the intake port, and a louver provided in the intake port and having a plurality of vanes for rectifying the introduced air.

13. The projector according to claim 12, wherein the absorber includes a substantially cylindrical cylinder portion, and an airflow sent from the fan is introduced into the intake port of the holder in a direction along an inner circumferential surface of the absorber, and the airflow introduced through the intake port flows and circulates along an inner circumferential surface of the ellipsoidal reflector and/or the absorber.

14. The projector according to claim 12, wherein the fan includes a discharge hole for discharging the airflow, and the intake port of the holder and the discharge hole of the fan are connected by a duct.

15. The projector according to claim 12, wherein the vanes are so disposed to incline against the light-emitting portion from the intake port with respect to an opening side of the intake port.

16. The projector according to claim 12, wherein the vanes are formed integrally with the absorber as cut pieces formed by cutting and bending a part of the absorber.

17. The projector according to claim 10, wherein one of the sealing portions protrudes forward from the ellipsoidal reflector in the light-radiation direction, the protruding sealing portion being covered with the holder.

18. The projector according to claim 10, wherein the double structure of the holder includes a holder body provided outside and the absorber provided inside of the holder body.

* * * * *